United States Patent
Witzenberger et al.

(10) Patent No.: US 7,621,354 B2
(45) Date of Patent: Nov. 24, 2009

(54) DRIVE SYSTEM FOR A TRACKED VEHICLE

(75) Inventors: Max Witzenberger, Aind-Oling (DE); Rolf Döbereiner, Augsburg (DE)

(73) Assignee: RENK Aktiengesellschaft, Augsburg (DE)

( * ) Notice: Subject to any disclaimer, the term of this patent is extended or adjusted under 35 U.S.C. 154(b) by 353 days.

(21) Appl. No.: 10/575,648

(22) PCT Filed: Oct. 14, 2003

(86) PCT No.: PCT/EP03/11373
§ 371 (c)(1),
(2), (4) Date: Jul. 14, 2006

(87) PCT Pub. No.: WO2005/047087
PCT Pub. Date: May 26, 2005

(65) Prior Publication Data
US 2007/0068710 A1    Mar. 29, 2007

(51) Int. Cl.
*B62D 11/10* (2006.01)
*B62D 11/02* (2006.01)

(52) U.S. Cl. .................. 180/6.48; 180/6.5; 180/6.7; 180/9.1

(58) Field of Classification Search ............. 180/6.48, 180/6.5, 6.7, 9.1
See application file for complete search history.

(56) References Cited

U.S. PATENT DOCUMENTS

| | | | |
|---|---|---|---|
| 4,890,508 A | 1/1990 | Zaunberger | |
| 4,998,591 A | 3/1991 | Zaunberger | |
| 5,078,027 A | 1/1992 | Lohmer et al. | |
| 5,509,491 A * | 4/1996 | Hall, III | 180/9.44 |
| 5,571,058 A * | 11/1996 | Schmidt | 475/5 |
| 6,491,599 B1 * | 12/2002 | Schmidt | 475/5 |
| 7,074,151 B2 * | 7/2006 | Thompson | 475/225 |
| 7,309,300 B2 * | 12/2007 | Garnett et al. | 475/18 |
| 7,410,437 B2 * | 8/2008 | Garnett | 475/5 |

FOREIGN PATENT DOCUMENTS

DE    1 124 830    1/1962

OTHER PUBLICATIONS

Search Report dated Jun. 11, 2004 issued for the corresponding European Application No. PCT/EP2003/011373.

* cited by examiner

*Primary Examiner*—Lesley D. Morris
*Assistant Examiner*—Marlon A Arce
(74) *Attorney, Agent, or Firm*—Cohen Pontani Lieberman & Pavane LLP

(57) ABSTRACT

A drive system for a tracked vehicle having an internal combustion engine with a crankshaft aligned transversely to a direction of travel includes a steering drive; a differential transmission having traction drive elements, steering drive elements, and a pair of drive outputs for a drive axle aligned parallel to the crankshaft; and a steering drive connection connecting the steering drive to the steering drive elements. A further drive element, which may be a change speed gearbox or an electric traction motor, is arranged in line with the internal combustion engine and transmits power to the traction drive elements.

16 Claims, 2 Drawing Sheets

DRIVE SYSTEM FOR A TRACKED VEHICLE

CROSS-REFERENCE TO RELATED APPLICATIONS

This is a US national stage of application No. PCT/EP2003/011373, filed on Oct. 14, 2003.

BACKGROUND OF THE INVENTION

1. Field of the Invention

The invention relates to a drive system for a tracked vehicle having means for driving the tracks at different speeds in order to steer the vehicle.

2. Description of the Related Art

It is known in general that, in tracked vehicles, a gearbox is provided in addition to a drive motor, which gearbox additionally also assumes the steering function of the vehicle, by driving the two drive tracks at different speeds. In addition, a plurality of selectable gear stages for forward and reverse travel, brakes and secondary drives for fans, air conditioning, etc. are usually provided on the gearbox.

The gearbox and the motor can be arranged in what is known as an L configuration with respect to one another, that is to say the driving motor is installed longitudinally in the vehicle and therefore lies transversely with respect to the drive axle or with respect to the gearbox which extends from one drive side to the other, that is to say it is installed in the vehicle transversely with respect to the direction of travel. Here, the motor can be arranged on the left or the right in the direction of travel and inputs its drive into the gearbox, for example, via a bevel gear set. In front-wheel drive, the motor is usually situated behind the gearbox in the L configuration and, in rear-wheel drive, ahead of the gearbox, in each case as viewed in the direction of travel. However, the motor can also be installed longitudinally approximately in the vehicle centre, this being referred to as a T configuration.

In what is known as the U configuration, the drive motor is likewise arranged transversely with respect to the direction of travel, parallel to the gearbox or to the drive axle. The motor can be connected to the gearbox, for example, via a spur gear train as transfer gearbox. In a front-wheel-drive vehicle, the motor lies behind the gearbox as viewed in the direction of travel, and the motor lies in front of the gearbox in a vehicle with rear-wheel drive.

However, these drive arrangements require a very large amount of installation space and restrict the utilizable space in the vehicle to a very great extent.

A compact drive arrangement for a Ukrainian T-72 tank is known from the Polish specialist magazine "Nowa Technika Wojskowa", issue 9/98 page 22. A rear-wheel-drive system is shown, in which the drive motor is arranged transversely between the drive track wheels in the vehicle. The motor inputs its drive in each case into a change-speed gearbox on both sides. For this purpose, an identical gearbox is arranged on both sides of the motor, which gearboxes can be shifted into 5 forward and three reverse gears. The differential speed at the two drive sides for steering the vehicle can be generated only by selecting different gears on the left-hand and right-hand gearbox. Driving around bends with a vehicle of this type requires a large amount of skill from the driver, as the steering radius cannot be set in an infinitely variable manner, but is dependent on the gear ratios. If the bend, which is predefined, for example, by the roadway, does not correspond to a selectable gear radius, the driver has to set the steering radius to be driven in a jolting fashion by rapid changeover of the gear stages.

As a result, a vehicle of this type can be steered only in a very imprecise manner, which results in a safety risk and potential of danger for other traffic participants. For this reason, vehicles of this type are not permitted in public road traffic in many countries.

DE 37 28 171 has disclosed an electromechanical drive system for fully tracked vehicles. In the simplest case, this drive system comprises an electric traction motor which drives both vehicle sides via a central shaft in the same direction and an electric steering motor which drives a zero shaft, the rotational speed of which has a positive effect on one side and a negative effect on the other side. Steering differentials on the left and right add the rotational speeds of the two motors and transmit the summed output to the track wheels. A generator which is driven by an internal combustion engine is provided to generate the electric drive and steering power. The internal combustion engine and the generator can be arranged longitudinally or transversely in the vehicle. The traction motor and/or steering motor can be arranged directly on the drive shaft or next to it, inputting their power into the traction drive or steering drive via bevel gear drives.

SUMMARY OF THE INVENTION

It is the object of the invention to provide a vehicle with a compact drive arrangement, which vehicle can be steered precisely and reliably.

According to the invention this object is achieved by the features of patent claim 1.

The drive system according to the invention provides an advantageously compact arrangement which makes reliable drive and precise steering of a vehicle possible.

Further features and advantages result from the subclaims in conjunction with the description.

In the following text, the features of the present invention will be explained in greater detail using preferred embodiments. In the associated diagrammatic drawings:

DETAILED DESCRIPTION OF THE PRESENTLY PREFERRED EMBODIMENTS

Figure 1:
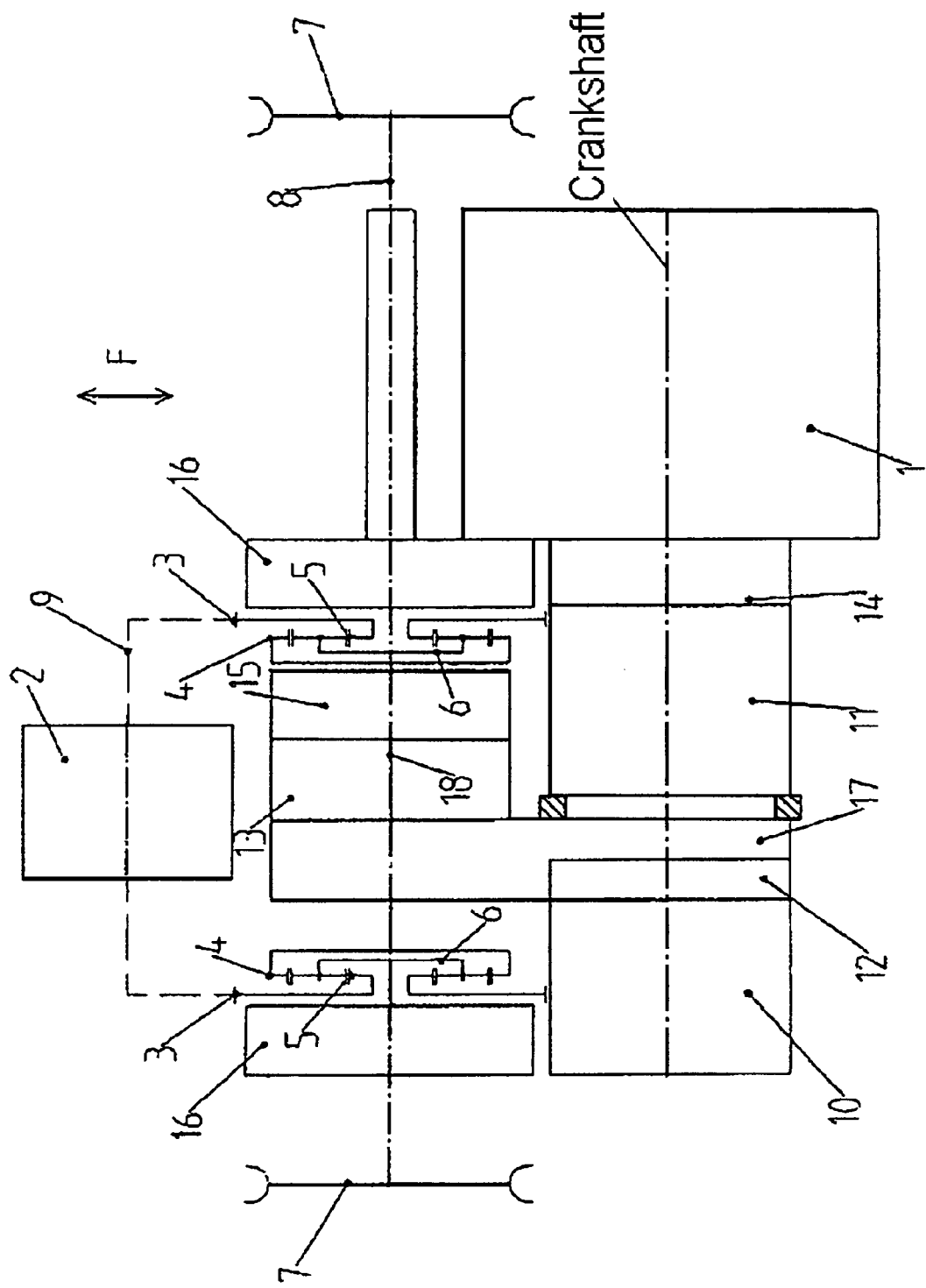
FIG. 1 shows a first exemplary embodiment of the drive system according to the invention.

FIG. 1 shows a drive axle 8 of a tracked vehicle, on which drive axle 8 in each case a track drive wheel 7 is arranged on both sides for driving a traction track. An internal combustion engine 1 which is arranged parallel to the drive axle 8 is provided to generate the drive power. The parallel orientation of the internal combustion engine 1 is related to its main axis, which means that the axis of its crankshaft is oriented parallel to the drive axle 8. The internal combustion engine 1 drives a change-speed gearbox 10 which is arranged laterally next to the internal combustion engine 1, as viewed in the direction of travel F. The change-speed gearbox 10 can be shifted at least into two different gear stages, and the drive power can be transmitted via a transfer gearbox 17 to a differential transmission arrangement 3 which is arranged on the drive axle 8.

A differential transmission arrangement 3 is preferably provided for each drive side and is driven via a traction drive element, for example an internal gear 4. The internal gears 4 of the two drive sides can be connected to one another via a shaft 18. In the exemplary differential transmission arrangements 3 which are shown, the power is output via the planetary gear carrier 6 as drive output. Brakes 16 are provided on both sides of the drive outputs 6, and the drive outputs 6 are connected to the track drive wheels 7 via drive shafts.

For driving around bends, a steering drive 2 is provided which transmits drive power from one drive side to the other drive side via a steering drive connection 9 known as a zero shaft. The steering drive 2 is preferably configured as an electric motor having a plurality of independent current circuits or having two independent electric motors. The zero shaft drives the sun gears 5 of the differential transmission arrangements 3 via gear trains which are not shown in greater detail, which sun gears 5 act as steering drive elements 5. One more gear wheel is provided on one gear train for driving a sun gear 5 than on the other gear train, with the result that the sun gears of the two differential transmission arrangements 3 are driven in different rotational directions. The driver can actuate the steering motor 2 via a steering element and can regulate it in an infinitely variable manner, with the result that one traction track is accelerated and the other is decelerated and the vehicle drives around a corresponding bend. The zero shaft 9 is stopped for driving in a straight line.

In the diagrammatic illustration, the steering drive 2 is shown rotated by 90° in the plane of the drive axle 8. In the actual design, the steering drive 2 is arranged above the drive axle 8 (see FIG. 1*b*).

A generator 14 for generating electric power can be arranged between the change-speed gearbox 10 and the internal combustion engine 1. The generator 14 is preferably driven directly by the crankshaft of the internal combustion engine 1, as what is known as a crankshaft generator.

Furthermore, a hydrodynamic torque converter 11 can be provided for transmitting the drive power from the internal combustion engine 1 to the change-speed gearbox 10, which torque converter 11 is preferably arranged between the generator 14 and the change-speed gearbox 10.

In order to increase the switching stages, a further change-speed gearbox 12 can be coupled to the first change-speed gearbox 10, which further change-speed gearbox 12 is arranged laterally next to the first change-speed gearbox 10 and forms a line parallel to the drive axle 8 together with the internal combustion engine 1 and the first change-speed gearbox 10.

At least two selectable gear stages are provided on the further change-speed gearbox 12, and power can be input via the transfer gearbox 17 which is arranged between the change-speed gearboxes 10 and 12 either into an internal gear 4 of a differential transmission arrangement 3 or into a further change-speed gearbox 13. This third change-speed gearbox 13 is preferably arranged on the drive axle 8 and can likewise be switched into two gear stages. The switching stages which are provided on the individual change-speed gearboxes are multiplied by coupling the change-speed gearboxes 10, 12 and 13, and it is possible to achieve, for example, two times two times two, that is to say eight drivable gear stages.

A reverse stage is preferably provided on one change-speed gearbox for driving in the reverse direction.

A particularly advantageously compact drive arrangement results from the lateral arrangement of the internal combustion engine 1 next to the generator 14, torque converter 11 and one change-speed gearbox 10, the elements forming a line and being arranged in a manner which is oriented parallel to the drive axle 8.

A retarder 15 can be provided on the shaft 18 in order to increase the braking power.

Figure 2:
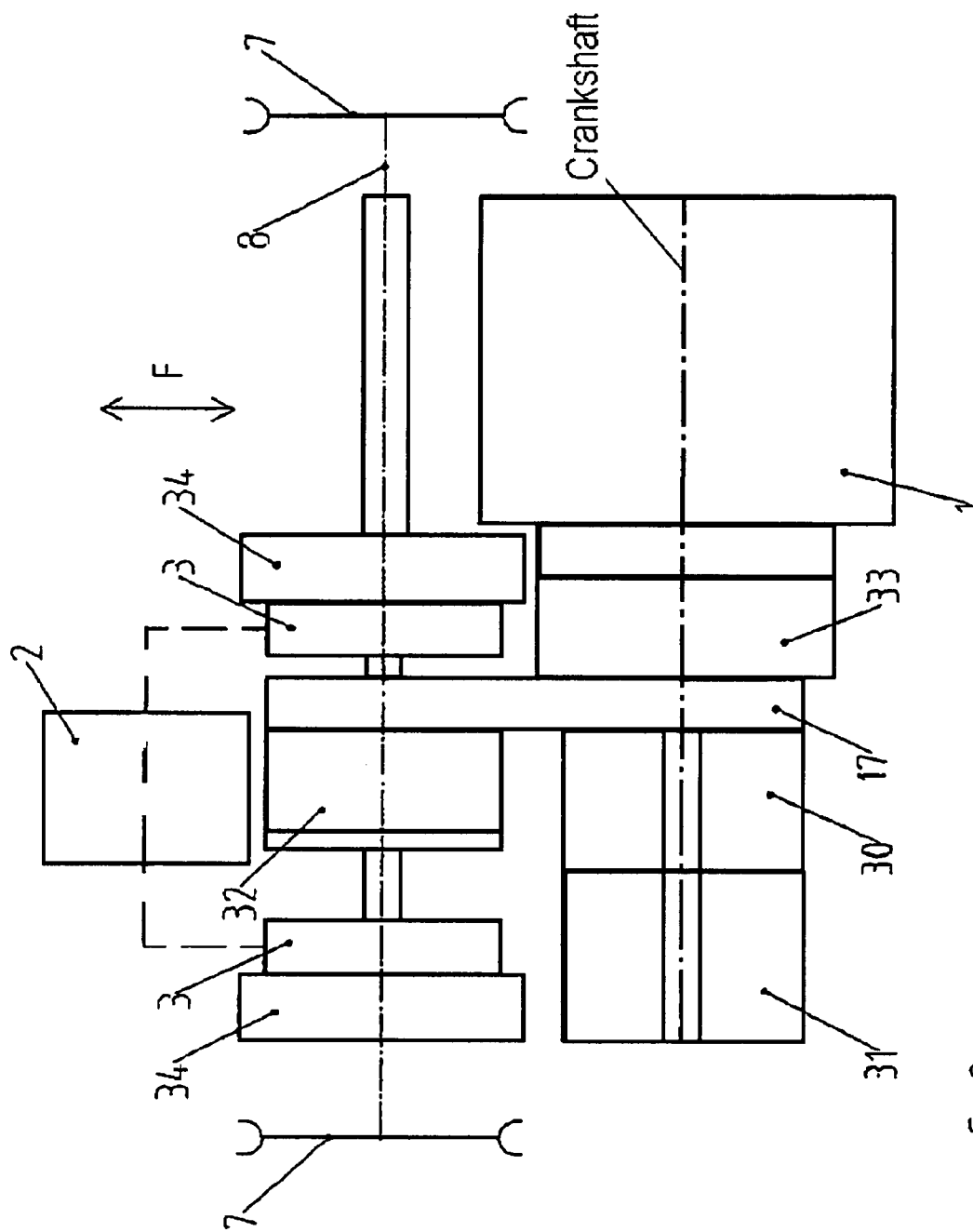
FIG. 2 shows a further drive system according to the invention.

FIG. 2 shows a further embodiment of the drive system according to the invention. The drive axle 8 having the differential arrangements 3, the brakes at the drive outputs and the track drive wheels 7 and the steering drive 2 with zero shaft 9 corresponds in principle to the arrangement according to FIG. 1. An internal combustion engine 1 which is arranged parallel to the drive axle 8 is also provided in the embodiment according to FIG. 2, in order to generate the drive power. However, the internal combustion engine 1 does not input its power into a change-speed gearbox, but rather into an electric traction motor 30 via a generator 33. The electric traction motor 30 transmits the mechanical drive power via a transfer gearbox 17 either directly to a traction drive element of a differential transmission arrangement 3 or via a change-speed gearbox 32 to a differential transmission arrangement 3. The change-speed gearbox 32 can be switched at least into two different gear stages and is preferably arranged on the drive axle 8. The electric traction drive motor 30 can be arranged laterally next to the internal combustion engine 1, as viewed in the direction of travel F, which results in a particularly compact drive arrangement.

In order to increase the operational reliability, it is also possible for two traction motors 30, 31 which can be operated independently of one another to be provided instead of a single traction motor. It is, however, also possible to provide a traction motor which is equipped with a plurality of independent current circuits, with the result that it can continue to drive the vehicle if one circuit fails.

An advantageously compact drive results from the arrangement of the internal combustion engine 1 in a line with the generator 33 next to the traction motors 30, 31 which lie substantially in the same line parallel to the drive axle 8.

The core concept of the present invention is to be seen in the fact that an internal combustion engine and at least one further drive element, a change-speed gearbox according to FIG. 1 or an electric traction motor according to FIG. 2, are arranged next to one another and these elements which form a line are arranged parallel to the drive axle of a vehicle, which results in an advantageously compact drive unit.

The transfer gearbox 17 can be configured as a switchable two-gear or multiple-gear spur gear mechanism.

What are known as lateral intermediate transmissions can be provided on the track drive wheels 7 as end drives having a fixed transmission ratio, and the brakes 16, 34 can be integrated into the lateral intermediate transmissions.

An elastic coupling can be arranged between the internal combustion engine 1 and the generator 14, 33, for example what is known as a Geislinger coupling.

A drive arrangement according to the invention can be provided as a front-wheel-drive system or a rear-wheel-drive system.

What is claimed is:

1. A drive system for a tracked vehicle having an internal combustion engine with a crankshaft aligned transversely to a direction of travel, the system comprising;
    a steering drive;
    a differential transmission having at least one traction drive element, at least one steering drive element, and a pair of drive outputs for a drive axle aligned parallel to the crankshaft;
    a steering drive connection connecting the steering drive to at least one said steering drive element; and
    a further drive element for transmitting power from said internal combustion engine to said at least one traction drive element, said further drive element being arranged in line with said internal combustion engine, transversely to the direction of travel,
    wherein the further drive element comprises a first change speed gearbox having at least two selectable gear stages.

2. The drive system of claim 1 further comprising a hydrodynamic torque converter arranged between the internal combustion engine and the change speed gearbox.

3. The drive system of claim 1 further comprising a second change speed gearbox having at least two selectable gear stages, said second change speed gearbox being arranged in line with said first change speed gearbox and said internal combustion engine, parallel to said drive axle.

4. The drive system of claim 1 comprising a further change speed gearbox arranged on the drive axle and having at least two selectable gear stages.

5. The drive system of claim 1 further comprising a generator driven by said internal combustion engine.

6. The drive system of claim 5 wherein the generator is arranged on the crankshaft between the internal combustion engine and the further drive element.

7. The drive system of claim 1 wherein the further drive element is an electric traction motor.

8. The drive system of claim 7 further comprising a change speed gearbox provided between the electric traction motor and the traction drive element, said change speed gearbox having at least two selectable gear stages.

9. The drive system of claim 7 wherein the steering drive comprises an electric steering motor.

10. The drive system of claim 9 wherein at least one of said electric traction motor and said electric steering motor comprises two independent current circuits.

11. The drive system of claim 1 further comprising a retarder on at least one said traction drive element.

12. The drive system of claim 7 wherein at least one of said electric traction motor and said electric steering motor comprises two independent electric motors.

13. The drive system of claim 1 further comprising a pair of brakes arranged on respective drive outputs.

14. The drive system of claim 12 further comprising lateral intermediate transmissions on the drive outputs, the brakes being arranged in the lateral intermediate transmissions.

15. The drive system of claim 1 further comprising a transfer gearbox which transmits drive power from said further drive element to said differential transmission.

16. The drive system of claim 15 wherein the transfer gearbox has at least two selectable gear stages.

* * * * *